United States Patent [19]

Clark, Jr. et al.

[11] Patent Number: 5,077,789

[45] Date of Patent: Dec. 31, 1991

[54] REMOTELY COMMANDED TELEPHONE SWITCH ENHANCING SYSTEM

[76] Inventors: Milas G. Clark, Jr., 135 W. 88th St., Los Angeles, Calif. 90003; Jerry F. Jones, Jr., 23912 Sandhurst La., Harbor City, Calif. 90710; Anthony X. Caduto, 20600 Steve Jon St., Saugus, Calif. 91350

[21] Appl. No.: 382,670

[22] PCT Filed: Dec. 24, 1987

[86] PCT No.: PCT/US87/03486

§ 371 Date: Jun. 19, 1989

§ 102(e) Date: Jun. 19, 1989

[87] PCT Pub. No.: WO89/06077

PCT Pub. Date: Jun. 29, 1989

[51] Int. Cl.$^5$ .............................................. H04M 3/42
[52] U.S. Cl. ..................................... 379/211; 379/201
[58] Field of Search ............... 379/211, 210, 212, 201, 379/213, 214

[56] References Cited

U.S. PATENT DOCUMENTS

| | | | |
|---|---|---|---|
| 4,413,158 | 11/1983 | Danford | 379/211 |
| 4,475,009 | 10/1984 | Rais et al. | 379/211 |
| 4,670,900 | 6/1987 | Waldman | 379/211 |
| 4,677,663 | 6/1987 | Szlam | 379/211 |
| 4,768,224 | 8/1988 | Waldman | 379/211 |
| 4,807,279 | 2/1989 | McClure et al. | 379/211 |
| 4,878,243 | 10/1989 | Hashimoto | 379/211 |

*Primary Examiner*—James L. Dwyer
*Assistant Examiner*—Ahmad F. Matar
*Attorney, Agent, or Firm*—Albert O. Cota

[57] ABSTRACT

A remotely commanded switch enhancing system (10) that is designed to enhance the utility of the telephone call forwarding service. The system (10) functions in combiantion with a local telephon set (40) that is connected to a single telephone line. The system is comprised of a set of electronic circuits that operates with a CPU (20) and firmware (30) to allow the initiation of call forwarding, changing the current call forwarded telephone number to another telephone number or the cancellation of the call forwarded number. One of the principal advantages of the system (10) is that only a single telephone line is required—unlike the prior art remote call forwarding devices where two telephone lines are required.

14 Claims, 7 Drawing Sheets

REMOTELY COMMANDED TELEPHONE SWITCH ENHANCING SYSTEM

TECHNICAL FIELD

The invention pertains to the general field of telephone switch enhancement systems and more particularly to a system that allows an incoming telephone call reaching a first telephone to be changed and call forwarded to a second telephone where the call forwarded number may be selected and changed from a third telephone at a remote location.

BACKGROUND ART

The use of call forwarding, which is also known as call tranferring or call diverting, as offered by the various telephone companies has gained wide range acceptance. This acceptance is especially true in the business community where the service, in many cases, has become indispensable. A call forwarding system functions by allowing an incoming telephone call arriving at a first telephone to be transferred or forwarded to a second telephone having a different telephone number. Thus, the person making the telephone number change is assured that any calls received by the first telephone will be transferred to the second telephone where the person is now located.

The prior art call forwarding or call diverting system as disclosed, are generally more complex with respect to their electronic circuits and associated parts count. This complexity decreases the product reliability and increases maintainability costs. Complexity and cost is further increased by the requirement that these systems have two telephone lines to function.

Other product problems that are prevalent to prior art call forwarding systems include:
- timing problems and particularly timing problems in combination with the various dial tones, which in many cases will abort the incoming calls,
- confusion of noise on telephone lines with dial tones,
- complex software and/or firmware, A search of the prior art did not disclose any patents that read directly on the claims of the instant invention, however, the following U.S. patents were considered related:

| U.S. PAT. NO. | INVENTOR | ISSUED |
| --- | --- | --- |
| 3,959,600 | Sousa | 28 May 1976 |
| 3,704,346 | Smith, et al | 28 November 1972 |

The Sousa patent discloses a remotely programmable telephone call forwarding and switching device that requires two telephone lines to operate. The device has the capability to answer telephone calls, bridge telephone lines, dial preprogrammed numbers, program its memory locally and remotely and to confirm the newly programmed number. Circuitry is also included to allow the device to be used within telephone systems having diverse equipment and operational capabilities.

The Smith etal patent discloses a call diversion system for receiving a telephone call, dialing out a different number through a second line and linking the two lines. The dial out number can be reprogrammed locally or remotely by sending signals into the system. Automatic dial-out proceeds by a counting process that times the dial pulses and pauses. The system is designed to divert calls immediately when in the operate mode and defers diversion when in the standby mode. Thus, giving the user the opportunity to answer the phone directly.

DISCLOSURE OF THE INVENTION

The remotely commanded telephone switch enhancing system is designed to enhance the utility of the telephone call forwarding service by allowing the following three call forwarding functions to be performed from a remotely located telephone:
- initiate call forwarding,
- change the current call forwarded telephone number to another number, or
- cancel call forwarding.

One of the advantages of the inventive system is that only a single Telephone Central Office (TCO) telephone line and a single TOUCHTONE ® telephone set are required to perform the remotely programmed call forwarding functions. TOUCHTONE is a registered trademark of American Telegraph and Telephone Inc. (AT&T) of New York, United States of America.

The remote call forwarding and call transferring systems disclosed in the prior art have to distinct disadvantages—they utilize a more complex design and they require two telephone lines to remotely program and to change the current call forwarded telephone number. The only limitation imposed on the instant system is that the local telephone set be connected to a telephone line having the call forwarding service as provided by the telephone company.

The inventive system can function with either a Dual-Tone Multi-Frequency (DTMF) or an enhanced rotary dial telephone. However, further reference to telephones will be limited to the DTMF type.

The normal (non-remote) method for initiating call forwarding is to lift the telephone handset from its cradle and press into the telephone set keypad the number 72 followed by the "#" sign which is then followed by the telephone number where all future incoming calls will be forwarded to. When a call is received, a half-ring (also referred to as a courtesy ring) is received at the telephone set and the telephone line is switched at the TCO, to the call forwarded number.

To cancel or change the call forwarded number, the telephone handset is lifted, the number 73 followed by the "#" sign is pressed, and the handset is returned to the telephone cradle after two beeps are heard. This call forwarding cancellation sequence restores the telephone line service to its normal operation. To change to a new call forwarded number, the previous call forwarding initiation sequence as described in the above paragraph is followed.

The currently available call forwarding service, as offered by the telephone company, has a very distinct disadvantage—in that to initiate call forwarding or to change or cancel the call forwarded telephone number, the user must physically be present at the location of the telephone where the call forwarding service is installed.

The remotely commanded telephone switch enhancing system is enclosed in a single enclosure that houses all the circuit devices. On its front panel is located a "POWER" switch a "SYSTEM READY" indicator, a "CALL FORWARD" indicator that when illuminated indicates that the system is in the call forward mode, and a "PROGRAM MODE/LINE OPERATE" mode switch that when placed in the program mode allows the system to be initially programmed.

To install the system, the enclosure is simply connected to the utility power, the telephone line wall outlet and to the local telephone set by means of respective RJ-11 connectors.

Utility power is then applied and the system is initially programmed to allow operation in the specific location where the system will be operated. When the program initialization is complete the system is ready for use, The system firmware program that operates the system's CPU is designed to prevent unauthorized persons from using the system. Thus, only by having the proper access code can someone remotely initiate call forwarding or change or cancel the call forwarded number. Provisions also included in the firmware to allow the individual access code to be changed when necessary.

In view of the above disclosure, it is the primary object of the invention to provide a system that remotely provides the described call forwarding functions with only one line and one telephone set. In addition to the primary object it is also an object of the invention to;

allow the system to be connected to all national and international telephone lines, allow the system to be used with most enhanced standard (non keypad programmable) telephone sets, have a system that is highly reliable and maintenance free, have a system that is cost effective to manufacture have a system that is compatible with remote peripheral equipment such as television sets, burglar alarms, coffee pots and lighting systems, and allow the system to operate when a single ring, as provided by the TCO, is detected.

BEST MODE FOR CARRYING OUT THE INVENTION

The best mode for carrying out the invention is presented in terms of a preferred embodiment that is designed to provide three functions: initiate call forwarding, change the current call forwarded number to another number, or to cancel call forwarding. All three functions may be performed from a remotely located telephone set and only a single Telephone Central Office (TCO) line and a single local telephone set at the user's home or office are required. The only requirement imposed on the system is that the telephone line connected to the local telephone set, where the system is installed, have the call forwarding service as provided by the telephone company.

Figure 1:
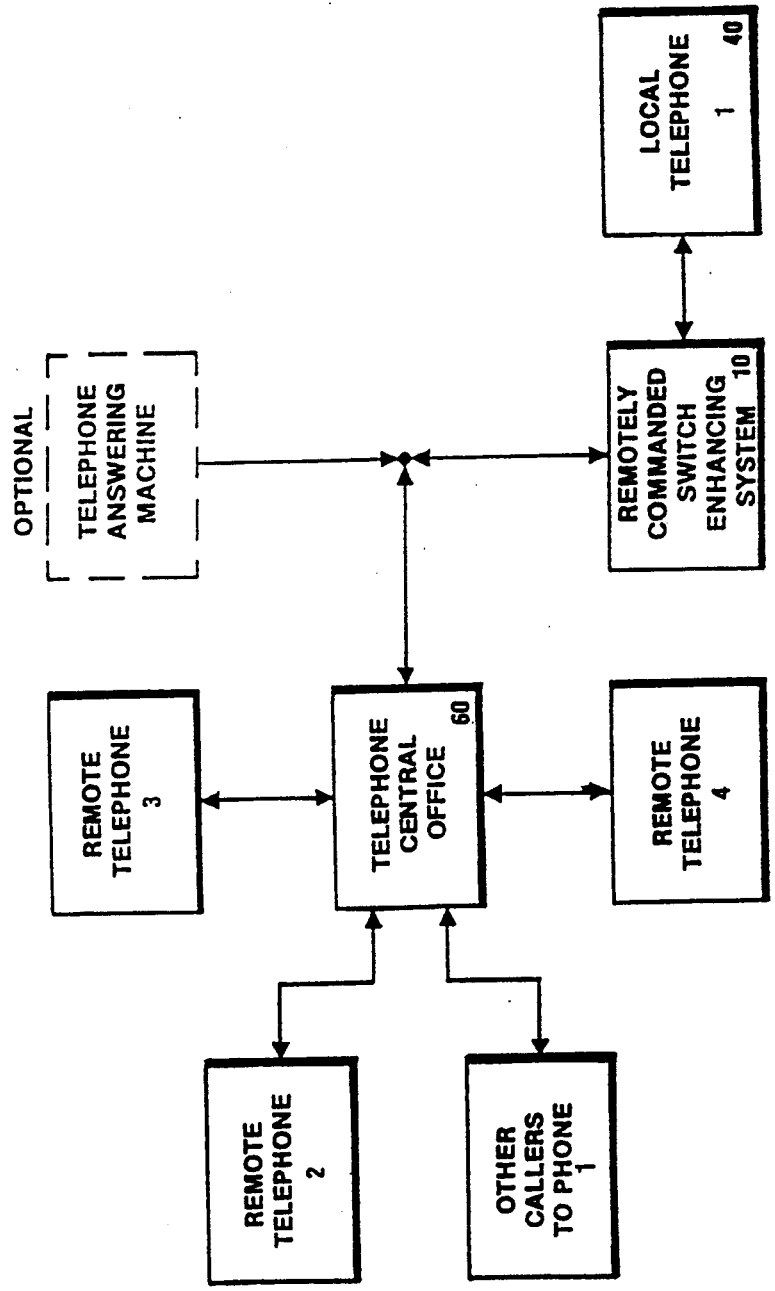
FIG. 1 is a block diagram showing the system with a local telephone and its interconnection with the TCO and a plurality of remotely located telephone sets.

The operation of the system 10 is best understood by referring to FIG. 1 which depicts how the system 10 is interconnected with a local telephone set no. 1 that is located at the system 10 installation and a set of three remotely located telephones: a telephone no. 2, telephone no. 3 and a telephone no. 4. To set the stage for a later presented description of the system's hardware and firmware, the chronological steps required to perform the following system functions:

A. Initiate call forwarding,
B. Change the call forwarded telephone number or
C. Cancel call forwarding.

INITIATE CALL FORWARDING

In the initiate scenario, as shown in FIG. 1, all calls arriving at a local telephone set no. 1 are to be forwarded to a remote telephone set no. 2 or 4 where the call forwarded initiation is accomplished from a remote telephone set no. 3 by the user and system 10 performing the following steps:

a) the user at the telephone set no. 3 calls the telephone number of the telephone set no. 1,
b) the system answers the telephone set no. 1 after a programmed number of rings are detected, pauses for a minimum of two seconds and then provides two beeps,
c) the user inputs a valid access code 2,
d) the system provides two beeps,
e) the user inputs a 72#, the telephone number of the telephone set no. 2 or 4 and a command complete code,
f) the system stores the telephone number of the telephone no. 2 or 4 and provide two beeps,
g) the user hangs up,
h) the system sends a 72# to the TCO together with the telephone number of the telephone no. 2 or 4 and turn on the CALL FORWARD ON indicator, and
i) the system waits for next call.

CHANGE THE CALL FORWARDED NUMBER

Four call forward change scenarios are presented. In the first scenario, the system 10 is in the non-default mode and the local telephone set no. 1 is call forwarded to a remote telephone set no. 3 and a user at telephone no. 3 wants to change the call forwarded telephone number from telephone no. 3 to a remote telephone set no. 2 or 4. The change is accomplished by the user and system performing the following steps:

a) the user at the telephone no. 3 calls the telephone number of the telephone no. 1 and after hearing a busy or a clicking noise hangs up,
b) the system detects ring and sends a 73# to the TCO to cancel call forwarding, the system then waits for a time period of between 120–150 seconds for the user to make next call,
c) the user at telephone no. 3 calls the telephone no. 1 within the 120–150 second period,
d) the system detects ring, answers the telephone no. 1, pauses for approximately two seconds and then provides two beeps,
e) the user inputs a valid access code 2,
f) the system provides two beeps,
g) the user inputs a 72#, the telephone number of the remote telephone set no. 2 or 4 and a command complete code, h) the system provides two beeps,
i) the user hangs up,
j) the system stores the telephone number of the telephone set no. 2 or 4, sends a 72# to the TCO together with the telephone number of remote telephone set no. 2 or 4, and
k) the system waits for next call.

In the second change scenario, the system 10 is also in the non-default mode and the local telephone set no. 1 is call forwarded to a remote telephone set no. 3 and a user at a telephone set no. 2 or 4 wants to change the call forwarded telephone number from telephone no. 3 to telephone no. 2 or 4. The change is accomplished by the user and said system performing the following steps:
  a) the user at the remote telephone set no. 2 or 4 calls the telephone number of the telephone no. 1 and after hearing one ring hangs up,
  b) the system detects ring and sends a 73# to the TCO to cancel call forwarding, the system then waits for a time period of between 120-150 seconds for the user to make next call,
  c) the user at telephone set no. 2 or 4 calls the telephone no. 1 within the 120-150 second period,
  d) the system detects ring, answers the telephone no. 1, pauses for approximately two seconds and provides two beeps,
  e) the user inputs a valid access code 2,
  f) the system provides two beeps,
  g) the user inputs a 72#, the telephone number of the remote telephone set no. 2 or 4 and a command complete code,
  h) the system provides two beeps,
  i) the user hangs up,
  j) the system stores the telephone number of the telephone set no. 2 or 4, sends a 72# to the TCO together with the telephone number of remote telephone set no. 2 or 4, and
  k) the system waits for next call.

In the third change scenario, the system 10 is in the default mode and the local telephone set no. 1 is call forwarded to a remote telephone set no. 3 and a user at the telephone set no. 3 wants to change the call forwarded telephone number from telephone no. 3 to a remote telephone set no. 2 or 4. The change is accomplished by the user and system performing the following steps:
  a) the user at the remote telephone no. 3 calls the telephone number of the telephone no. 1 and after hearing a busy or a clicking noise hangs up,
  b) the system detects ring and waits for 60-90 seconds and then calls its own number or telephone set no. 3 detects ring and gets an answer at the remote telephone no. 3,
  c) the system waits for a minimum of two seconds and then sends two beeps,
  d) the user inputs a valid access code 2,
  e) the system provides two beeps,
  f) the user inputs a 72#, the telephone number of the remote telephone set no. 2 or 4 and a command complete code,
  g) the system stores the telephone number of the telephone no. 2 or 4 and provides two beeps,
  h) the user hangs up,
  i) the system sends a 72# to the TCO together with the telephone number of remote telephone set no. 2 or 4, and
  k) the system waits for next call.

In the final and fourth change scenario, the system 10 is in the default mode and the local telephone set no. 1 is call forwarded to a remote telephone set no. 3 and a user at a telephone set 2 or 4 wants to change the call forwarded telephone number from telephone no. 3 to telephone no. 2 or 4. The change is accomplished by the user and system performing the following steps:
  a) the user at the telephone no. 2 or 4 calls the telephone number of the telephone no. 1 and after hearing one ring hangs up,
  b) the system detects ring and waits for 60-90 seconds, then calls it own number or telephone set no. 3, detects the ring at the telephone no. 3 and gets an answer,
  c) the system waits for a minimum of two seconds and then sends two beeps and waits for ten seconds for an input from the user, if no valid access code 2 is received within the ten second period the system hangs up,
  d) the system sends a 73# to the TCO to cancel call forwarding and then waits for 120-150 seconds,
  e) the user, during the 120-150 second period, calls the telephone number of telephone no. 1,
  f) the system detects ring and answers the telephone no. 1, waits for two seconds, and then provides two beeps,
  g) the user inputs a valid access code 2,
  h) the system gives two beeps,
  i) the user inputs a 72#, the telephone number of the remote telephone set no. 4 and a command complete code,
  j) the system stores the telephone number of the telephone set no. 4 and provides two beeps,
  k) the user hangs up,
  l) the system sends a 72# to TCO together with the telephone number of remote telephone set no. 4 and,
  m) the system waits for next call.

CANCEL CALL FORWARDING

Six cancel call forward scenarios are presented. In the first scenario, the system 10 is in the non-default mode and the local telephone set no. 1 is call forwarded to a remote telephone set no. 3 and a user at telephone set no. 3 wants to cancel call forwarding. The cancellation is accomplished by the user and system performing the following steps:
  a) the user at the telephone no. 3 calls the telephone number of the telephone no. 1 and after hearing a busy or a clicking noise hangs up,
  b) the system detects ring and sends a 73# to the TCO to cancel call forwarding, the system then waits for a time period of between 120-150 seconds for the user to make next call,
  c) the user at telephone set no. 3 calls telephone no. 1 within the 120-150 second period,
  d) the system detects ring, answers the telephone no. 1, pauses for a minimum two seconds and provides two beeps,
  e) the user inputs a valid access code 2,
  f) the system provides two beeps,
  g) the user inputs a 73# and a command complete code,
  h) the system provides two beeps,
  i) the user hangs up,
  j) the system sends a 73# to the TCO to cancel call forwarding, and
  k) the system waits for next call.

In the second cancellation scenario, the system 10 is also in the non-default mode and the local telephone set no. 1 is call forwarded to a remote telephone set no. 3 and a user at a telephone set no. 2 or 4 wants to cancel the call forwarded number. The cancellation is accomplished by the user and system performing the following steps:

a) the user at the remote telephone set no. 2 or 4 calls the telephone number of the telephone no. 1 and after hearing a busy or a clicking noise hangs up, b) the system detects ring and sends a 73# to the TCO to cancel call forwarding, system then waits for a time period of between 120-150 seconds for the user to make next call, c) the user at telephone set no. 2 or 4 calls the telephone no. 1 within the 120-150 second period, d) the system detects ring, answers the telephone no. 1, pauses for a minimum of two seconds and provides two beeps, e) the user inputs a valid access code 2, f) the system provides two beeps, g) the user inputs a 73# and a command complete code, h) the system provides two beeps, i) the user hangs up, j) the system sends a 73# to the TCO to cancel call forwarding, and k) the system waits for next call.

In the third cancellation scenario, the system 10 is in the default mode and the local telephone set no. 1 is call forwarded to a remote telephone set no. 3 and a user at telephone set no. 3 wants to cancel call forwarding. The cancellation is accomplished by the user and system performing the following steps:

a) the user at the remote telephone no. 3 calls the telephone number of the telephone no. 1 and after hearing a busy or a clicking noise hangs up, b) the system detects ring and waits for 60-90 seconds and then calls its own number or telephone set no. 3 detects ring and gets an answer at the remote telephone no. 3, c) the system waits for a minimum of two seconds and then provides two beeps, d) the user inputs a valid access code 2, e) the system provides two beeps, f) the user inputs a 73# and a command complete code, g) the system provides two beeps, h) the user hangs up, i) the system sends a 73# to the TCO to cancel call forwarding, and j) the system waits for next call.

In the fourth cancellation scenario, the system 10 is in the default mode and the local telephone set no. 1 is call forwarded to a remote telephone set no. 3 and a user at a remote telephone set 2 or 4 wants to cancel call forwarding. The cancellation is accomplished by the user and system performing the following steps:

a) the user at the telephone no. 2 or 4 calls the telephone number of the telephone no. 1 and after hearing one ring hangs up, b) the system detects ring and waits for 60-90 seconds, then calls its own number or telephone set no. 3, detects the ring at the telephone no. 3 and gets an answer, c) the system waits for a minimum of two seconds and then sends two beeps and waits for ten seconds for an input from the user, if no valid access code 2 is received within the ten second period, the system hangs up, d) the system sends a 73# to the TCO to cancel call forwarding and then waits for 120-150 seconds, e) the user, during the 120-150 second period, calls the telephone number of the telephone no. 1, f) the system detects ring and answers the telephone no. 1, waits for two seconds, and then provides two beeps, g) the user inputs a valid access code 2, h) the system gives two beeps, i) the user inputs a 73# and a command complete code, j) the system provides two beeps, k) the user hangs up, l) the system sends a 73# to TCO to cancel call forwarding, and m) the system waits for next call.

In the fifth cancellation scenario, the system 10 is also in the default mode and the local telephone set no. 1 is call forwarded to a remote telephone set no. 3 and a user at a remote telephone set no. 2 or 4 wants to cancel call forwarding. The cancellation is accomplished by the user and a system performing the following steps:

a) the user at the telephone no. 2 or 4 calls the telephone number of the telephone no. 1 and after hearing one ring hangs up, b) the system detects ring and waits for 60-90 seconds, then calls its own number or telephone set no. 3 detects five rings at the telephone no. 3 and gets no answer, c) the system hangs up, d) the system sends a 73# to the TCO to cancel call forwarding and then waits for 120-150 seconds, e) the user, during the 120-150 second period, calls the telephone number of telephone no. 1, f) the system detects ring and answers the telephone no. 1, waits for a minimum of two seconds and then provides two beeps, g) the user inputs a valid access code 2, h) the system gives two beeps, i) the user inputs a 73# and a command complete code, j) the system provides two beeps, k) the user hangs up, l) the system sends a 73# to TCO to cancel call forwarding, and m) the system waits for next call.

In the sixth and final cancellation scenario, the system 10 is in the default mode and the local telephone set no. 1 is call forwarded to a remote telephone set no. 3 and a user at a remote telephone set no 2 or 4 wants to cancel call forwarding. The cancellation is accomplished by the user and system performing the following steps:

a) the user at the telephone no. 2 or 4 calls the telephone number of the telephone no. 1 and after hearing one ring hangs up, b) the system detects a ring, waits for 60-90 seconds, then calls its own number or telephone set no. 3 and the system detects a busy signal at telephone set no. 3, c) the system hangs up, d) the system sends a 73# to the TCO to cancel call forwarding and then waits for 120-150 seconds, e) the user, during the 120-150 second period, calls the telephone number of telephone no. 1, f) the system detects ring and answers telephone no. 1, waits for a minimum of two seconds, and then provides two beeps,
g) the user inputs a valid access code 2,
h) the system gives two beeps,
i) the user inputs a 73# and a command complete code,
j) the system provides two beeps,
k) the user hangs up,
l) the system sends a 73# to TCO to cnacel call forwarding, and
m) the system waits for next call.

One of the system's novel operating characteristics, as may be perceived from the above discussion, is the ability of the electronic circuits and firmware to produce a telephone line access time period. During this time period, a user may remotely enter any of the system's operational commands. These commands are used during the user activated initiation, changing or cancellation of the call forwarding service.

The system also provides a two-level security access code. The code is used in the operating sequence to prevent accidental or unauthorized user from tampering with the system The system's hardware, as shown in FIGS. 1 through 7, is comprised of thirteen major elements: an enclosure and cable set 12, a power-on reset/RAM keep alive circuit 14, a line detector ring-tip interface circuit 16, a signal and control logic circuit 18, a CPU 20 that includes a RAM 20a, a tone transceiver circuit 22, an internal bus 24, a latch 26, a PROM 28, incorporating the system firmware 30, a data access arrangement circuit 32, and a power distribution circuit 34.

The above system elements function in combination with external elements that include a local telephone set 40, a telephone wall outlet 42, the utility power 44, a power adapter 46 and the telephone central office (TCO) 60.

Figure 2:
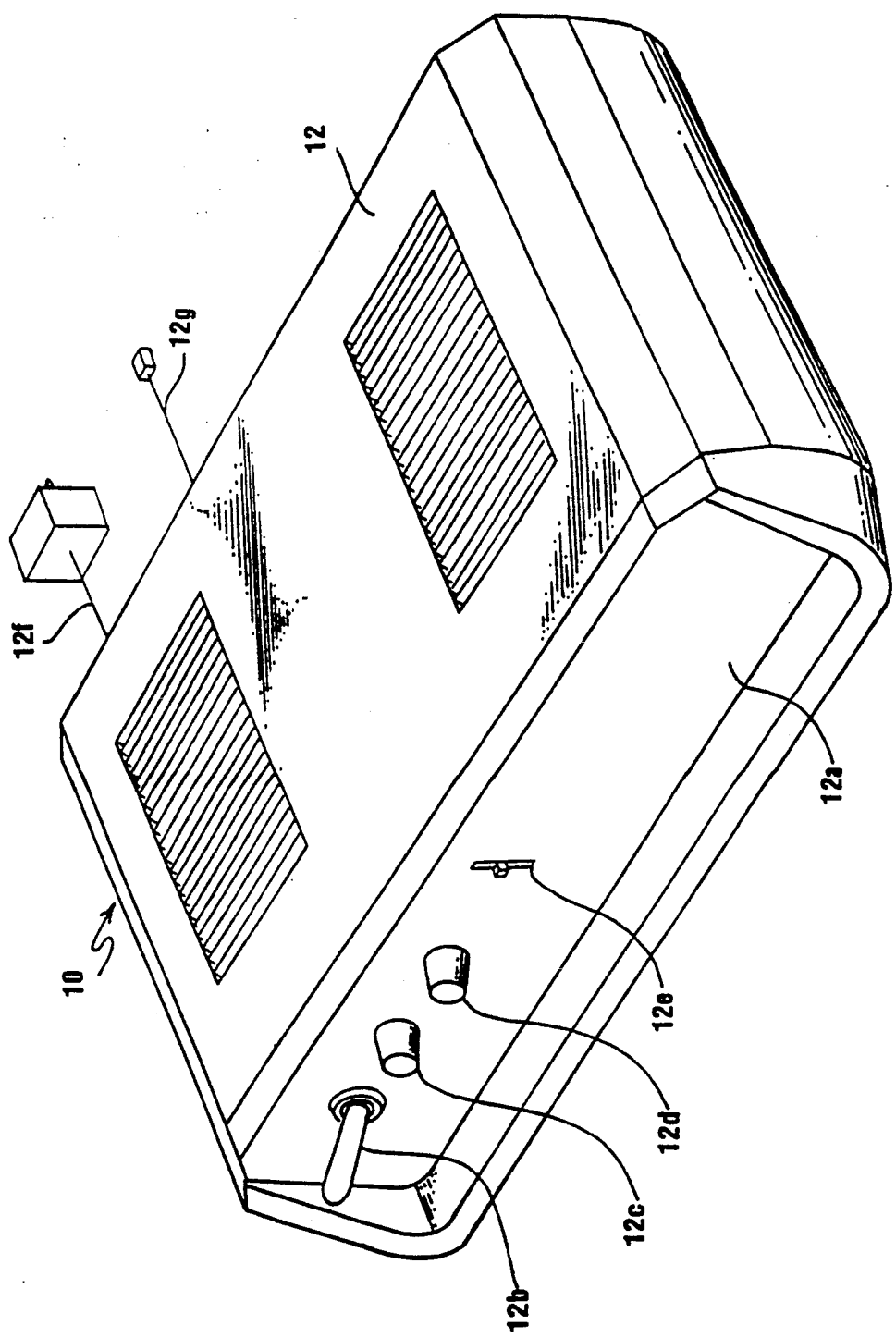
FIG. 2 is a perspective view of the system enclosure showing a typical front panel layout and cable set.

The remotely commanded telephone switch enhancing system 10 is designed to be housed in a single enclosure 12, as shown in FIG. 2, that preferably measures 2 by 6 by 8 inches (5.08 by 15.24 by 20.32 cm's). The enclosure houses all system components including a printed circuit board that has attached all the circuit devices and interconnections.

Figure 3:
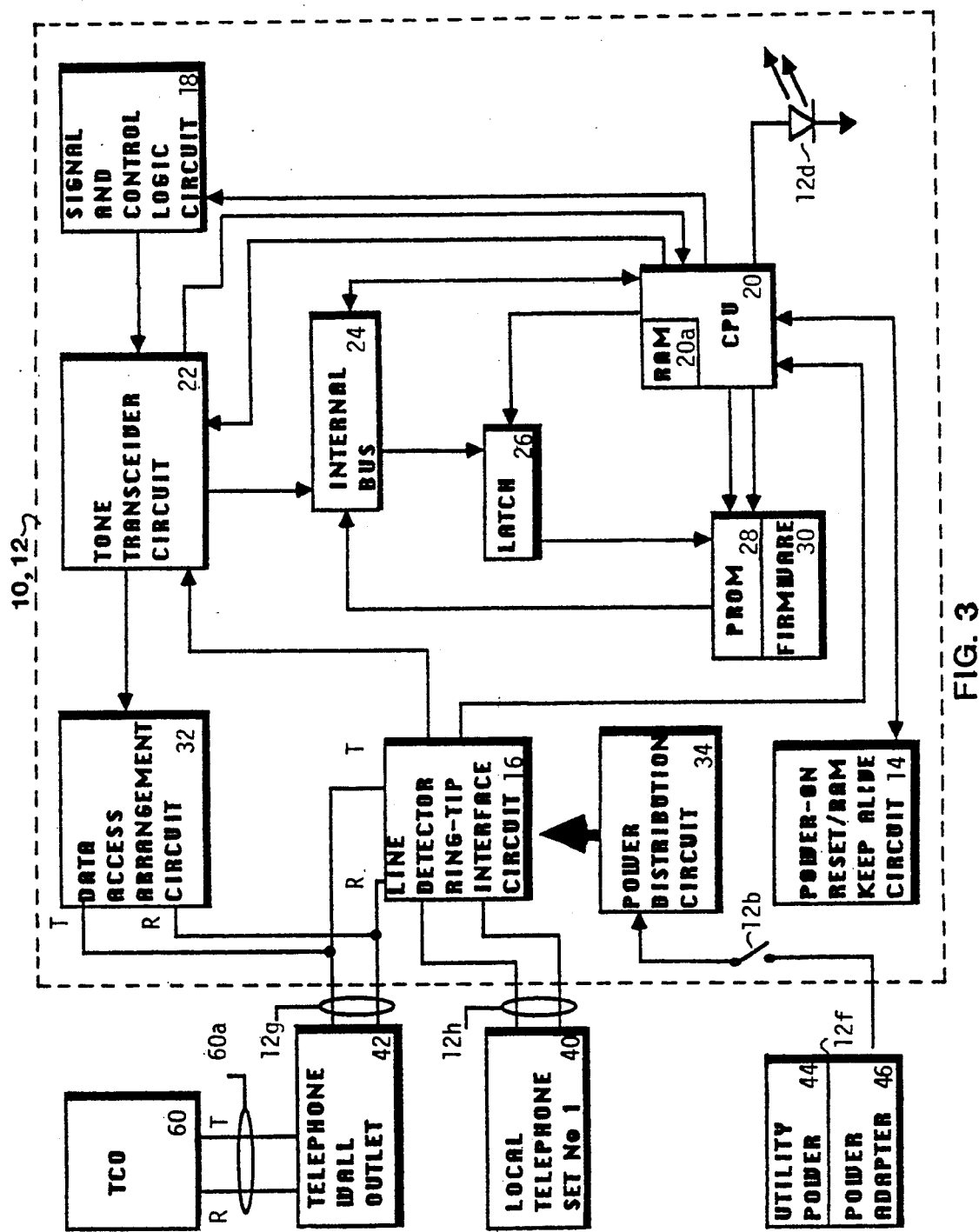
FIG. 3 is a block diagram of the overall system and the interfacing external elements.

On the front panel of the enclosure 12 is located a POWER switch 12b, a SYSTEM READY indicator 12c, a CALL FORWARD indicator 12d and a PROGRAM MODE/LINE OPERATE MODE switch 12e. On the enclosure's back panel is located an a-c power cord 12f that is connected to the power adapter 46 which, in turn, plugs into the utility power 44. The adapter reduces the 120 v a-c utility power to 13.8 v a-c. Also, connected to the back panel is a telephone wall outlet cord 12g, that connects the system to the Telephone Central Office (TCO) 60 via the telephone wall outlet 42, and a telephone receptacle (not shown) that allows the local telephone set cord 12h, that is connected to the local telephone set 40, to be connected to the system. The system connections to the external elements are shown in FIGS. 1 and 3.

The CALL FORWARD ON indicator 12d is an LED that continuously flashes when a battery 14a located in the power-on reset/RAM keep-alive circuit 14 is low. This indicator also indicates that the system 10 has acquired the characteristic signals (ring, busy, left off-hook and dial tone) of the local telephone line.

Figure 6:
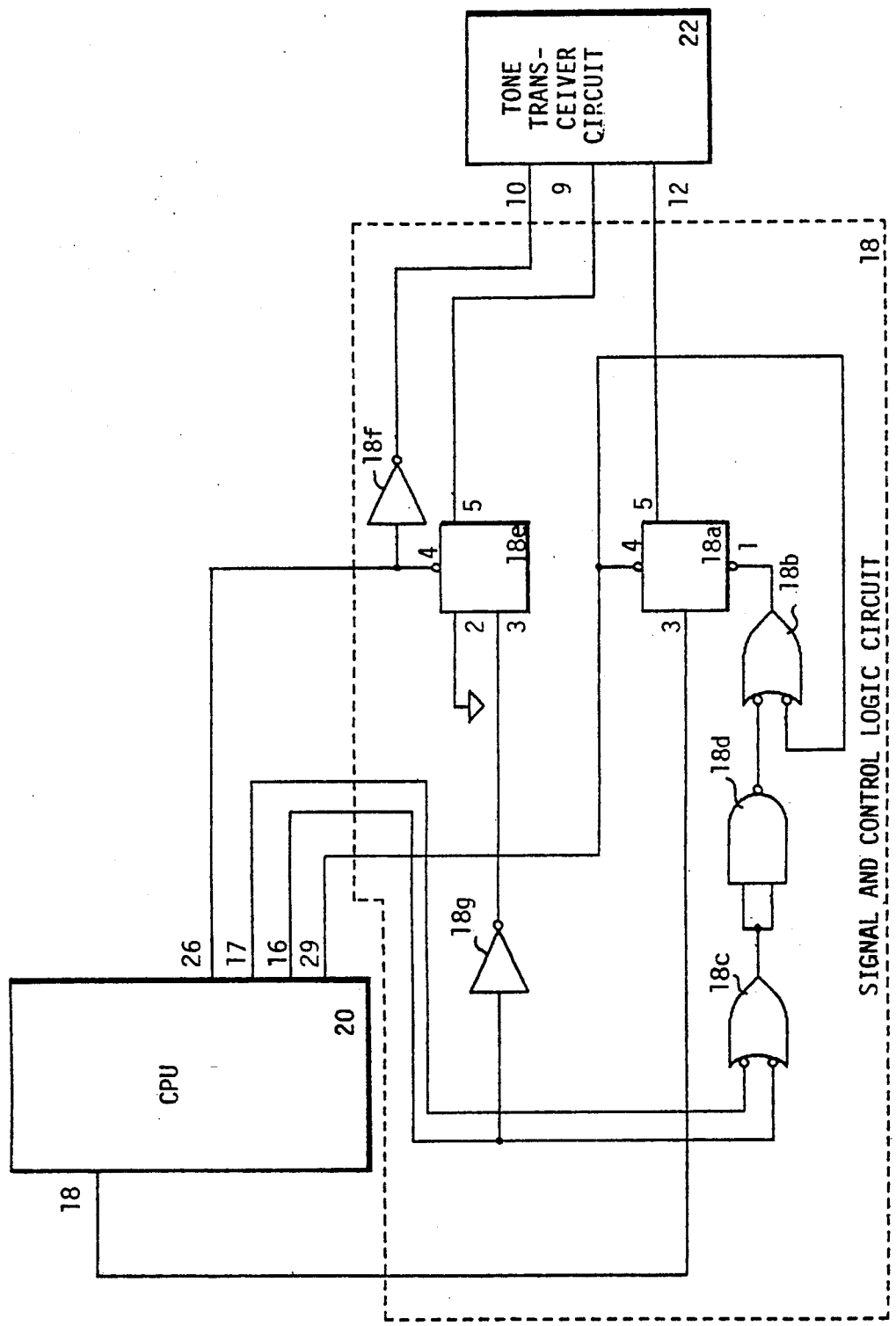
FIG. 6 is a partial schematic of the signal and control logic circuit.
Figure 7:
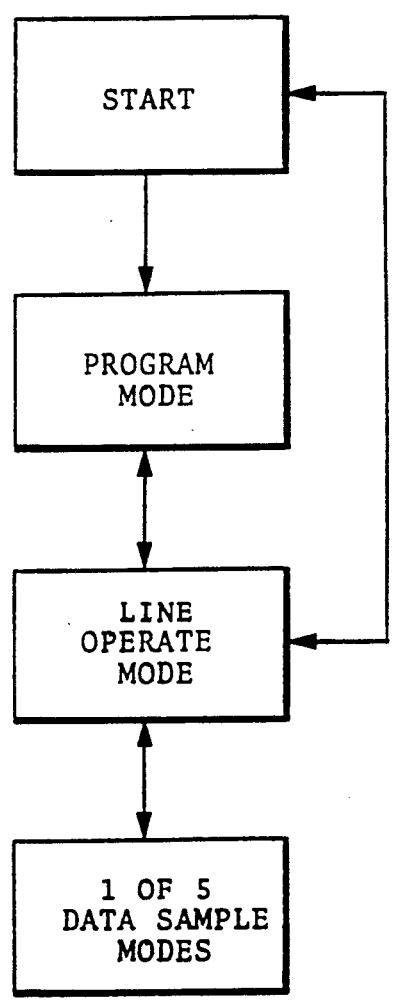
FIG. 7 is a flow diagram of the system firmware.

The acquisition of these line characteristics are user programmed only at the time the system 10 is installed. To program or set-up the system, the PROGRAM MODE/LINE OPERATE MODE switch 12e, which is electrically connected into the line detector ring-tip interface circuit 16 as shown in FIG. 6, is placed in the PROGRAM MODE. When so placed, the ring and tip telephone line from the telephone wall outlet 42 is disconnected and the telephone line from the local telephone set no. 40 is allowed to pass on to the line detector ring-tip interface circuit 16. When the system programming is complete, the switch 12e is placed in the LINE OPERATE MODE to cause the telephone lines from the telephone wall outlet to be reconnected into the circuit 16 and allow the system 10 to operate in its normal mode. The programming sequence is described infra in the firmware section and shown in the firmware system flow diagram of FIG. 7.

The circuits that comprise the system 10 are next described with reference to FIG. 3. When the power switch 12b is placed in the ON position, the power from the power adapter 46 is applied to the power distribution circuit 34 from where the various d-c power levels required to operate the system are distributed. The system 10 is designed around a CPU 20 that in the preferred embodiment is an Intel Corporation 8031 microprocessor.

The CPU has the means to control the operation of the system 10 and functions in combination with an internal bus 24, a latch 26, a Random Access Memory (RAM) 20a, a Programmable Read Only Memory (PROM) 28 and associated firmware 30. The internal bus 24 together with the latch 26 provide an interconnection means between selected circuits of the system; the RAM 20a controls a memory-mapped system as described in the firmware section and listed in Table II; and the PROM 28 controls the systems operational codes as described and listed in Table III of the firmware section.

Figure 4:
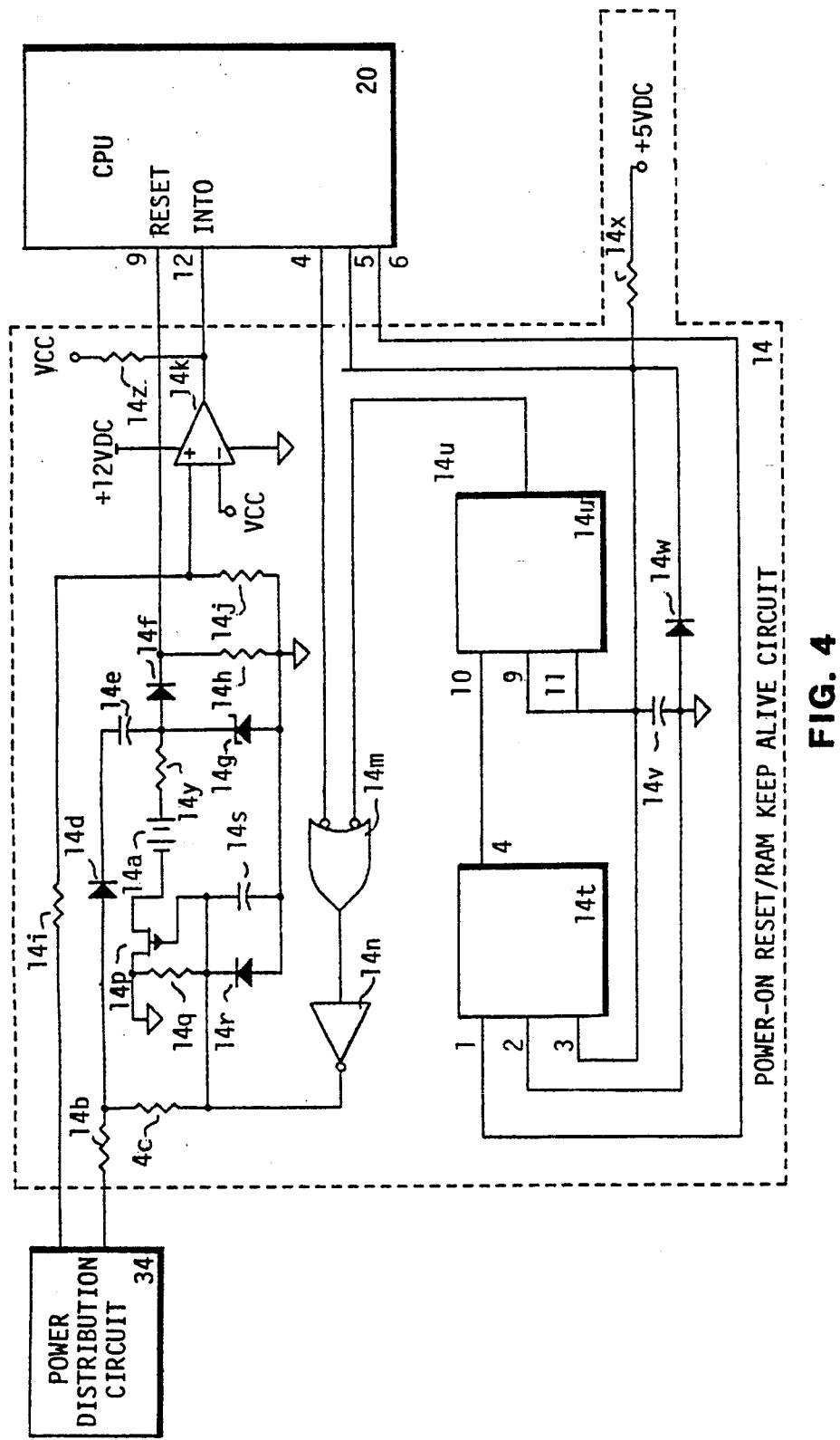
FIG. 4 is a partial schematic of the power-on reset/-RAM keep-alive circuit and the corresponding pin connection of the CPU.

The power-on reset /RAM keep alive circuit 14, as shown in FIGS. 3 and 4 initializes the CPU 20 when the system power distribution circuit 34 is turned on by the power switch 12b. The circuit 14 is normally powered by a 14-volt d-c voltage supplied by the power distribution circuit 34. The circuit 14 also maintains a 9-volt battery 14a that automatically switches on in the event of a utility power 44 failure. By having back-up power, the call forwarded telephone numbers and line characteristics that are stored in memory in the RAM 20a are not lost if the main power source should fail.

The circuit 14 has the following five interfacing connections with the CPU 20:

| CPU Input/Output | CPU Pin No. | Signal | Function |
| --- | --- | --- | --- |
| Input | 9 | RESET | Power-On Reset (POR) |
| Input | 12 | INTO | Power Interrupt (PI) |
| Output | 4 | P1.3 | CPU Self Reset (CSR) |
| Output | 5 | P1.4 | Watch-Dog Timer Reset (WD-TR) |
| Output | 6 | P1.5 | Watch-Dog Timer Start (WD-TS) |

When the system's power switch 12b is placed in the ON position, the 14-volt d-c power is applied through a voltage divider consisting of resistors 14b and 14c and a series circuit consisting of diode 14d, capacitor 14e and diode 14f. The voltage is limited to 5.6 V d-c by zener diode 14g and subsequently dropped to 5-volts d-c by diode 14f before it is applied to pin 9 (Reset) of the CPU. Resistor 14h provides the charging path for capacitor 14e. As the capacitor charges the input voltage at pin 9 of the CPU discharges to a low voltage state which allows the CPU to power on reset.

Figure 5:
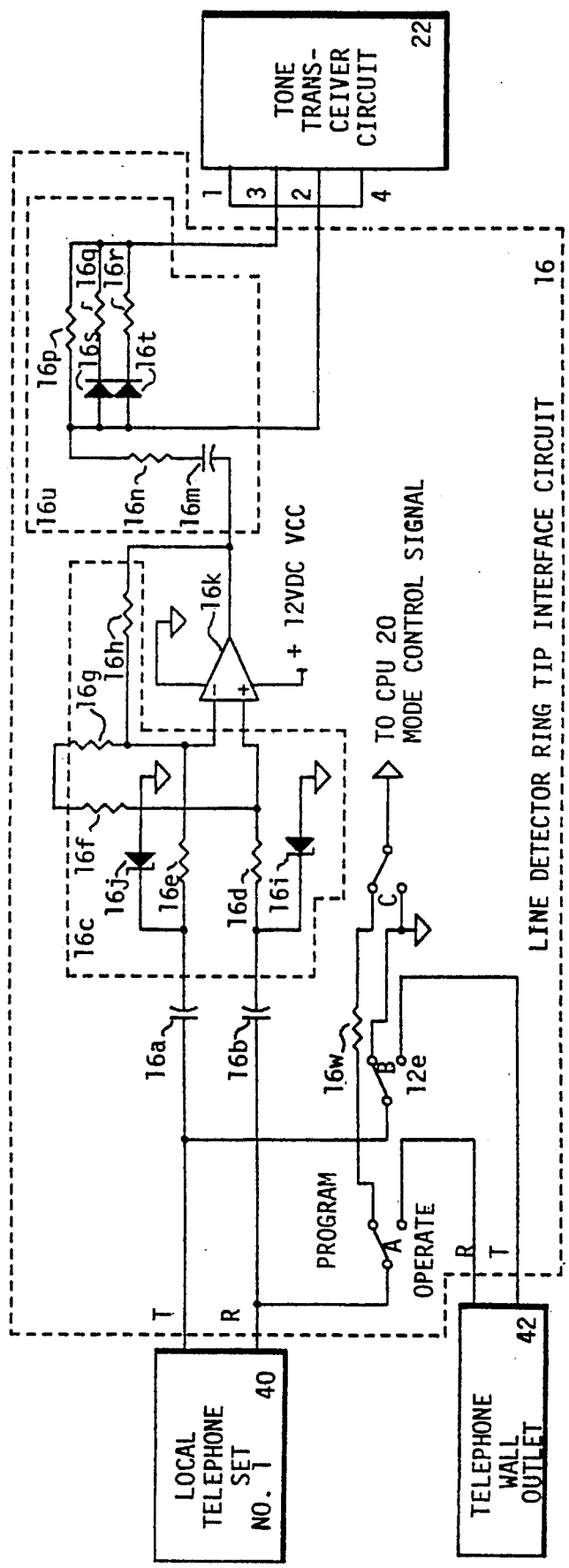
FIG. 5 is a partial schematic of the line detector ring-tip interface circuit and the pin connections of the tone transceiver circuit.

When the system power is turned OFF or a utility power failure occurs, the voltage divider network consisting of resistors 14i and 14j supplies a low level power interrupt signal through a comparator 14k to pin 12 (INTO) of the CPU 20. When this signal is received, a low level signal is available at pin 4 (P1.3) of the CPU. This low level signal is applied to pin 1 of a two-input NAND gate 14m that in turn, has an output that is applied to the input of an inverter buffer/driver 14n. The resulting output from 14n pulls the gate of a P-channel MOS FET device 14p to a low-level condition allowing the device to turn on. With the 9-volt battery 14a connected as shown in FIG. 5, the MOS FET device 14p allows the battery voltage that is limited to 5 V d-c by resistor 14y, diode 14f and zener diode 14g to be applied to pin 9 (Reset) of the CPU 20 thus, keeping the RAM voltage at the required voltage level.

The circuit 14 is designed so that the CPU 20 and MOS FET 14p control at the same time. Thus, when the gate of the MOS FET is being pulled down to its low level, the voltage applied to pin 9 of the CPU is maintained at its reset voltage level. During this period, capacitor 14s is discharged and diode 14r provides a voltage clamp for the negative voltage spike that occurs during the discharge. During this same period, the 14 v d-c power has not dropped to a sufficient level when control is lost by the CPU 20. Therefore, capacitor 14s must maintain a slow charge so that the MOS FET is not allowed to turn off.

The circuit 14 also incorporates a Watch-Dog Timer (WDT) that is operational only during the call forward mode. The WDT is designed to reset the operational characteristics of the CPU 20 in the event a glitch, in the power or telephone line, disrupts the operational sequence of the firmware controlling the CPU. The WDT consists of a 500 millisecond retriggable monostable multivibrator 14t, a 10 microsecond retriggable multi-vibrator 14u and a power-on reset circuit consisting of capacitor 14v, diode 14w and resistor 14x.

The CPU 20 starts the timing sequence of the WDT by providing the timer 14t with a low level start signal derived from pin 6 (P1.5) of the CPU. Once the timer has started, the CPU program cycles the timer input approximately every 490 MS to assure that the operating sequence of the CPU is maintained. The watch-dog reset signal from pin 5 (P1.4) of the CPU is used to reset and clear the timer 14t to its standby mode of operation.

If the CPU should lose track of its program sequence and fails to toggle the watch-dog timer (P1.5) 14t, after the 500 MS time has elapsed, the timer 14t supplies a signal from pin 4 ($\overline{Q}$) that is applied to pin 10 (B) of timer 14u. This signal triggers timer 14u and allows this timer to provide a signal that enables NAND gate 14m. The gate output, as previously covered, causes the CPU to go to location zero to allow the program sequence to be restarted and return to its correct sequence.

The line detector ring-tip interface circuit 16, as shown in FIGS. 3 and 5, interfaces with the inputs from the TCO 60 via the telephone wall outlet 42, and the input from the local telephone set 40 that has access to the call forwarding service. The output of this circuit, as shown in FIG. 3, is an RS-BF signal that is applied to the CPU 20 and an LAS tone signal that is applied to the tone transceiver circuit 22.

The differential ring (R) and tip (T) input signal from telephone no. 1 is applied through a pair of coupling capacitors 16a, 16b to an impedance network 16c. The coupling capacitors are also connected to the R and T signal supplied from the telephone wall outlet 42, via wiper arms A and B of the panel mounted three-pole double-throw switch 12e when the switch is placed in the LINE OPERATE MODE. When in this mode, the switch through wiper arm C, also provides a mode control signal to the CPU 20 where the CPU confirms the systems mode of operation.

The other position of switch 12e is the PROGRAM MODE. When placed in this position, the R and T signal from the telephone outlet 42, is disconnected from the circuit 16 and a d-c bias voltage is applied via Vcc and resistor 16w to the local telephone set to allow the system to be programmed as described infra.

The impedance network 16c, that receives the R and T signal from coupling capacitors 16a, 16b is comprised of resistors 16d, 16e, 16f, 16g and 16h; and zener diodes 16i and 16h. The telephone line, at this junction, may have a peak-to-peak voltage as high as 200 volts. Therefore, zener diodes 16i and 16h are provided to voltage clamp this high level voltage to a d-c level that does not exceed the input requirements of operational amplifier 16k which receives the signal from the network 16c. The differential R and T input signal is also gain adjusted by the resistance ratio provided by resistors 16d, 16e and 16h.

The output signal of the operational amplifier 16k will vary around a d-c bias point established by resistors 16f and 16g. Therefore, to eliminate the d-c component of this signal and establish a low frequency breakpoint, the combination of capacitor 16m and resistor 16n are utilized.

The output of the operational amplifier 16k is applied through an input network 16u that produces a non-linear gain function tone signal that is applied to the tone transceiver circuit 22. The gain setting is based on the input signal strength of the operational amplifier 16k. At a low level, the basic transfer function to pin 3 (GS) of the transceiver circuit 22 is set primarily by the ratio of resistors 16n and 16p. As the signal strength increases, diodes 16s and 16t turn on causing the output gain of the transfer function to be decreased by the parallel combination of resistors 16q and 16r, to limit the gain as a function of input signal strength. The feedback network is connected from outpin 3 (GS) of the transceiver 22 and input pin 2 (IN-) which is the effective summing mode.

The signal and control logic circuit 18 has an its primary function to allow the CPU 20 to communicate with the tone transceiver circuit 22. The circuit 18, as shown in FIGS. 3 and 6, supplies three signals, as directed and controlled by the CPU 20, to the circuit 22: a read/write ($R/\overline{W}$) signal is applied to pin 9 (RW), a chip select signal to pin 10 (CS) and a clock signal to pin 12 ($\phi$2). By controlling the application of these signals, the circuit 22 can be placed in any of its three major modes of operation: call progress mode (CP); tone burst mode (TB) or DTMF mode (DTMF).

In describing the signal and control logic circuit 18, reference is made to FIG. 6.

The clock signal, which is derived from pin 29 (PSEN) of the CPU 20, is applied to the preset input of a D-type flip-flop 18a and is also one of two signals applied to NAND gate 18b that when enabled supplies the clear input to the flip-flop 18a. The second input required to enable the flip-flop 18a is provided by NAND gate 18c through and NAND gate 18d which is configured as an inverter. When the flip-flop 18a is cleared, a low output signal is produced that is is then applied to the clock input of circuit 22. The NAND gate 18c is enabled by the write and read signals from pin 16 ($\overline{WR}$) and pin 17 ($\overline{RD}$) of the CPU 20.

The communication interface between the CPU 20 and the tone transceiver circuit 22 is accomplished as follows: initially, the signal and control logic circuit 18 select circuit 22 by means of the firmware 30. Subsequently, address lines A12 and A13 from the CPU 20 are selected.

Line A13 is an address line that is used to control the RSO input to circuit 22. The A13 line is applied to the preset input of flip-flop 18e and is also the input signal to inverter 18f. The output of the inverter 18f is applied in its low state to the $\overline{CS}$ input of circuit 22. When signal A13 goes high, the flip-flop 18e is allowed to be clocked to a low state. If a write command is to be performed, the write ($\overline{WR}$) output from pin 16 of the CPU 20 is sent low and is applied to the input of inverter 18g. The output of the inverter is then applied to the clock input of flip-flop 18e. Since the D input of flip-flop 18e is grounded, its Q output is sent low which is the level required for the write command applied to pin 9 (RW) of circuit 22.

At this time in the CPU 20 cycle, the write or read lines are in their low state. These CPU outputs are applied to NAND gate 18c allowing the output of this gate to go through the inverter 18d to provide a low state signal to NAND gate 18b. The other and enabling input to gate 18b is provided by the PSEN output from the CPU 20. The output of gate 18b which is connected to the clear input of flip-flop 18a causes the Q output to be clocked high by the master clock signal from pin 18 (XTAL 2) of the CPU 20. Thus, the 83.3 ns delay, required by the circuit 22, is provided when the 02 clock signal goes high after a read or write command is sent by the CPU 20. For a read command, the output of flip-flop 18e is already set to a high level output.

The tone transceiver circuit 22 in the preferred embodiment is comprised of a Mitel Corporation ISO²-CMOS MT8880 integrated DTMF transceiver device as shown in FIGS. 3 and 5. The device is designed to receive and identify DTMF tones and to translate these tones into a digital work for processing by the CPU 20 and to produce precise tone burst signals as directed by the CPU. These tone burst signals are then applied through pin 8 (TONE) to the input of the DAA circuit 32 for further processing and subsequent application into the TCO telephone line.

The input to the circuit 22 is supplied from the impedance network 16u located in the line detector ring-tip interface circuit 16. The input is connected to the devices pin 2 (IN-) which is connected to an inverting operational amplifier configured with a single ended input. From pin 3 (GS) of the device, a gain select feedback signal from the amplifier is supplied back into the impedance network 16u. The input and output of the device 22 is controlled from signals provided by the CPU and the signal and control logic circuit 18. The circuit 18 provides three digital signals, a read/write input signal to pin 9 (R/W), a chip select signal to pin 10 ($\overline{CS}$) and a system clock input to pin 12 ($\phi$2). From the CPU 20 a register select signal is applied to pin 11 (RSO).

The CPU is controlled by an interrupt logic signal applied from the circuit 22 pin 13 (IRQ/CP). Further CPU 20, RAM 20A and PROM 28 control is provided through the devices CPU data bus buffer through pins 14-17 (DO-D3). These digital signals as applied through the systems 10 internal bus 24 and a latch 26 that latches the first eight address lines for the PROM 28 and firmware 30.

The data access arrangement (DAA) circuit 32, as shown in FIG. 3 receives the analog tone signals from the tone transceiver circuit 22. These tones are then translated to a tone level that complies with government standards such as Section 68 of the FCC rules as established in the United States of America.

The tone signal from pin 8 (TONE) of the tone transceiver circuit 22 is applied through an operational amplifier having an output that is transfromer coupled to the wiper arm of a single-pole single-throw (SPST) relay located in the DAA circuit 32. The relay is energized by a command signal supplied from pin 3 (P1.2) of the CPU 20. When the relay is energized its contact closes allowing the tone signal to be placed onto the R and T telephone line connected to the TCO 60 via the telephone wall outlet 42. The tone signal is also routed to the local telephone set 40 when the PROGRAM MODE/LINE OPERATE MODE switch 12e, as shown in FIG. 5, is placed in the line operate mode.

The final circuit described is a Bus Interface Device System (BIDS) that allows a set of control signals supplied by the system 10, as shown in FIG. 3 and listed in TABLE I, to be applied external to the system enclosure via a connector (not shown).

The control signals allow the system 10 to remotely control the operation of a plurality of external implements connected to the system 10. Such implements include but are not limited to television sets, ovens, coffee makers, burglar alarm systems and the like.

TABLE I

| BIDS BUS CONNECTOR SIGNALS | | | |
|---|---|---|---|
| SIGNAL NAME | SYSTEM CIRCUIT | SH | NS |
| CLOCK 6.0 MHZ | 20 | x | |
| ALE | 20 | x | |
| PSEN | 20 | x | |
| T1 | 20 | | x |
| TXD | 20 | | x |
| RXD | 20 | | x |
| INT1 | 20 | | x |
| RD* | 20 | x | |
| WR* | 20 | x | |
| A14 | 20 | | x |
| A15 | 20 | | x |
| P1.7 | 20 | | x |
| CLOCK 3.58 MHZ | 22 | | x |
| D0-D7 | 24 | x | |
| +5 V VCC | 34 | | x |
| ~+12 VDC VCC | 34 | | x |
| VCC +14 V BD | 34 | | x |
| GND | 34 | | x |

SH = shown in FIG. 3.
NS = not shown in FIG. 3.

FIRMWARE

1. General Description

The firmware 30 for the system 10 is based on a memory-mapped system that assigns an address to the tone transceiver circuit 22 and the PROM 28. The names, descriptions and memory locations are listed in Table II.

TABLE II
SYMBOL TABLE

| Name | Description |
|---|---|
| Ph_chip | Address of MT8880 phone chip. |
| Cf_num | Starting address of stored call forward number. 16 locations long. |
| Ph_num | Starting address of units phone number. 7 locations long. |
| Cf_dig | Number of digits in call forward number. Maximum value = 16. |
| Dtmf_bf | DTMF flag. Set when MT8880 chip is put into DTMF mode. During this time the Processor can read the MT8880 to see which key has ben pressed. |
| Cp_bf | Call Progress flag. Set when MT8880 chip is put into Call Progress mode. The processor can sample the MT8880 to tell if the phone is ringing, busy, off-hook, left-off hook, etc. during this time. |
| Tb_bf | Tone Burst flag. Set when the MT8880 chip is put into the Tone Burst mode. During this time the MT8880 is outputting tones for dialing out and generating feedback to the user. |
| Sample_bf | Sample flag. This flag is set after the processor has acquired the phone line frequency characteristics (ring, busy, off-hook, dial tone, left off-hook). |
| Oh_bf | Off-hook flag. Set when processor detects that the phone has been taken off-hook. |
| Loh_bf | Left off-hook flag. Set when processor detects that the phone has been left off-hook greater than 35 seconds. |
| R_bf | Ring flag. Set when processor detects a ring on the phone. |
| B_bf | Busy flag. Set when processor detects a busy signal on the phone line. |
| Dt_bf | Dial tone flag. Set when processor detects dial tone. |
| Cf_bf | Call forward flag. Set when unit detects user wants to place system in call forward mode. |
| Can_cf | Cancel call forward flag. Set when user sends command to cancel call forward. Set also when unit is in call forward mode and a call has just been forwarded. |
| Su_bf | Set-up flag. Set at power-on reset. |
| Mode_bf | Mode select flag. 0 = default mode, 1 = non-default mode. |
| Access1 | Starting address for access code #1. 2 locations long. |
| Access2 | Starting address for access code #2. 3 locations long. |
| Num_un | Address for storing data for number of units on line (1 to 16). |
| No_rng | Address for storing the number of phone rings the system allows before answering. |
| Cmd_c | Starting address for command complete code. 2 locations long. |
| Loff_hk | Address where left off-hook signal frequency is stored. |
| Alarm_no | Starting address for numbers to be dialed if alarm is tripped. 20 locations long. |
| Busy | Address where busy signal frequency is stored. |
| Dial_t | Address where dial tone signal frequency is stored. |
| Can_th | Address where cancellation time is stored. Three locations are reserved. |

The firmware has four distinct sections. The first is the Battery Check section which is entered upon power-on reset. In this section of code, the CPU 20 checks to see if the RAM battery 14a located in the power-on reset-RAMP keep alive circuit 14 is within the proper operating voltage. If the battery drops below its limit, an interrupt signal occurs and the user is notified of the low voltage then by a flashing call forward on indicator 12d located on the front panel 12a of the system enclosure 12. Once the battery is verified to be operational, the system allows the user to enter the operational commands. Note that if the user does not replace a defective battery with a good battery, the system will not prevent the user from using the local telephone 40.

The main executive program manages the system 10 through its operating modes. The operating modes are determined by whether the system is or is not in the call forwarding mode. The user can also program the system to answer after one or five rings. The detailed operation sequences are described in section 3.0.

The remaining three sections of the firmware 30 are comprise: the Decode, Line Sample and Dial Out routines which do what their names imply. The Decode routine reads the time transceiver circuit 22 anytime a touchtone key is pressed. The keystrokes are stored in memory and the CPU 20 then determines if the entered keystrokes are operational commands or a telephone number the user is dialing. Table III lists the command description and expected inputs of the Decode routine. Note that some of the operational commands are user programmable.

TABLE III
COMMAND LIST

| Command | Description | Expected Input |
|---|---|---|
| *##1 | Program resident phone | 7 digit number |
| *##2 | Program access code #1 | 2 digit number |
| *##3 | Program access code #2 | 3 digit number |
| *##4 | Program Num units on line | 2 digit number max. 16 units. |
| *##5 | Program command complete | "*" and 1 digit |
| *##6 | Program phone rings | "1" or "5" |
| *##7 | Program cancellation time | 3 digit value of time that call forwarding is cancelled in seconds. |
| *##8 | Program Mode | "0" or "1" "0"= default "1"= non-default |
| *##9 | Program Alarm Code | Single digit between 0-9. |
| *##o | Program Alarm Number | Phone number + beeper number. |
| 1 of 5 Data Sample Modes | | |
| *#*1 (reserved) | Sample left-off hook | None |
| *#*2 (reserved) | Sample ring signal | None |
| *#*3 (reserved) | Sample busy signal | None |
| *#*4 | Sample dial tone signal | None |
| *#*5 (reserved) | Sample (other tone signals) | None |
| *#1 | Change call forward no. | 7 or 10 digit number |
| 72# | Activate call forwarding | 7 or 10 digit number |
| 73# | Cancel call forwarding | None |
| *n | Command complete code | None |
| ### | System hang-up code, programming session complete. | |

Note: The "n" in the command complete code can be any digit. It is user programmable.

The Line Sample routine monitors the tone transceiver circuit 22 during the period when its in the Call Progress mode. During this time, the CPU 20 is sampling the IRQ/CP line. Once the frequency of the signal has been acquired, the CPU checks the measured values versus the stored values for the busy, dial tone, off-hook and left off-hook signals. The stored values for the phone signals are a part of the set-up that the user performs after the system is initially turned on.

The dial-out routine closes the relay in the data access arrangement circuit 32 which then connects the tone transceiver circuit 22 to the telephone from the TCO 60. After the telephone line is connected, the CPU 20 writes the telephone number data to the tone transceiver circuit which, in turn, produces and applies the corresponding tones to the telephone line as best shown in FIG. 3. This is the means by which the system 10 dials the telephone numbers. Once the last digit of the number has been dialed, the tone transceiver circuit is placed in the Call Progress mode.

2. Detailed Firmware Description

1. Battery check routine
   a) CPU checks if Su_bf=1,
   b) If Su_bf=1 go to step f.
   c) If Su_bf not equal to 1, set Su_bf=1,
   d) CPU issues reset.
   e) CPU cycles call forward indicator 12d. CPU repeats until battery is in tolerance.
   f) Return to main.
2. Decode routine The decode routine is entered after the CPU 20 gets an interrupt from the tone transceiver circuit 22. This interrupt occurs when the circuit 22 is placed in the DTMF mode which occurs for 85 milliseconds. During this period, the IRQ/CP interrupt signal is enabled. If an interrupt occurs, the CPU reads the tone transceiver register to determine which key was pressed by the user. The pressed key is then stored into memory. A check is then made to determine if the pressed key is part of a valid command as shown in Table III. Flags will be set if the user wishes to initiate call forwarding or cancel call forwarding. When the user initiates call forwarding the telephone number to where the calls are to be forwarded, is stored into the systems memory for future use. As can be seen from Table III certain operational commands require the user to supply the input. The Decode routine assures that the expected input is validated and then is stored in memory.

The sample commands (*#*1-4) are executed usually only once. These commands cause the system 10 to sample the IRQ/CP line to obtain telephone line characteristic frequencies. This sampling is discussed in greater detail in the line sample routine section that follows. If the user moves to an area where the TCO is different, it will be necessary to repeat these commands.

3. Line Sample routine

The Line Sample routine has two operating modes: the first mode is when Sample_bf is equal to 0 which occurs when any of the sample commands are executed and the tone transceiver circuit 22 is in the Call Progress mode. The IRQ/CP interrupt is also disabled during this period. The CPU samples the IRQ/CP line by using a counter in the CPU for a period of 125 milliseconds. The routine will read the counter contents and calculate an average frequency which is stored in memory for future use. After all the telephone line signal frequencies have been acquired, Sample_bf is set equal to 1.

The second mode of the Line Sample routine is when Sample_bf is set equal to 1 which occurs when the tone transceiver circuit in the Call Progress mode for 20 milliseconds. During this time, the IRQ/CP interrupt is disabled. The CPU samples the IRQ/CP line during a 125 millisecond period. The sampled frequency is then compared to the stored acquired frequencies to determine if the telephone line indicates a busy, dial-tone, off-hook or left off-hook signal. Once the comparison is complete the appropriate flag is set. The system 10 is designed to indicate a ring signal. Therefore, the CPU just needs to read the state of an input to determine if the telephone is ringing.

3. Operating Sequences
1. Initial Operating sequence
   1.1 User install battery,
   1.2 User turns on unit
2. User Programs Unit
   A) User inputs *##1 (program resident telephone no.)
      a) CPU detects command
      b) CPU waits for 7 digit telephone number,
      C) After 7 digits are validated, CPU stores data starting at location Ph_num,
      d) CPU cycles (CP, DTMF)
   B) User inputs *##2 (program access code 1)
      a) CPU detects command
      b) CPU waits for 2 digit code,
      c) After 2 digits CPU stores data starting at location Access1,
      d) CPU cycles (CP, DTMF)
   C) User inputs *##3 (program access code 2)
      a) CPU detects command
      b) CPU waits for 3 digit code
      c) CPU stores data location at location Access 2,
      d) CPU cycles (CP, DTMF)
   D) User inputs *##4 (program 2 units on line)
      a) CPU detects command,
      b) CPU waits for the "2" key to be pressed,
      c) CPU sets location Two_un=2,
      d) CPU cycles (CP, DTMF)
   E) User inputs *##5 (program command complete code)
      a) CPU detects command,
      b) CPU waits for "*" plus 1 digit,
      c) CPU stores data starting at location Cmd_c,
      d) CPU cycles
   F) User inputs *##6 (program telephone rings)
      a) CPU detects command,
      b) CPU waits for "1" or "5",
      c) CPU stores data at location No_rng,
      d) CPU cycles
   G) User inputs *#*1 (Sample left off-hook)
      a) User leaves telephone off hook for approximately 45 seconds,
      b) Approximately 35 seconds after CPU detects command the tone transceiver circuit 22 is placed in Call progress mode,
      c) CPU calls Line Sample routine with Sample_bf=0.
      d) CPU determines frequency of left off-hook signal,
      e) CPU stores data at location Loff_hk,
      f) CPU cycles,
      g) User hangs up.
         Note: It takes the Telephone Central Office approximately 35 seconds to give the left off-hook signal.
   H) User inputs *#*3 (Sample busy signal)
      a) User dials telephone number,
      b) CPU detects telephone number being dialed,
      c) CPU enters Call Progress mode,
      d) CPU calls Line Sample routine,
      e) CPU determines frequency of busy signal,
      f) CPU stores data at location Busy,
      g) CPU cycles
      h) User hangs up,
   I) User inputs *#*4 (Sample dial tone)

a) User leaves telephone off hook,
b) CPU detects command,
c) CPU enters Call Progress mode,
d) CPU calls Line Sample routine,
e) CPU determines frequency of dial tone,
f) CPU stores data at location Dial__t,
g) CPU cycles,
h) User hangs up telephone after 5 second.
  Note: The 5 second period ensures that a good sample can be taken.

While the invention has been described in complete detail and pictorially shown in the accompanying drawings it is not to be limited to such details, since many changes and modifications may be made to the invention without departing from the spirit and the scope thereof. For example, the system 10, may operate with an automatic telephone answering machine connected in parallel as shown in FIG. 1. Hence, it is described to cover any and all modifications and forms which may come within the language and scope of the claims.

We claim:

1. A remotely commanded telephone switch enhancing system that functions in combination with a local telephone set connected to a single telephone line having call forwarding service as provided by a Telephone Central Office (TCO) where said system comprises a set of electronic circuits having the means to allow said system to be commanded from a remotely located telephone set to initiate call forwarding, change a current call forwarded number to another number or to cancel call forwarding, wherein said set of electronic circuits comprises:

a) an internal bus that provides an interconnection means between selected circuits of said electronics circuits,
 b) a firmware program,
 c) a central processing unit (CPU) having the means to function in combination with said internal bus, a latch, a random access memory (RAM), a programmable read only memory (PROM) and said firmware to control the operation of said system where said RAM, controls a memory-mapped system and said PROM controls the systems operational codes,
 d) a power-on reset/RAM keep alive circuit having the means to initialize said CPU when said power distribution circuit is energized and where said power-on reset/RAM keep alive circuit maintains an internal battery that automatically switches on in the event of a utility power failure.
 e) a line detector ring-tip interface circuit having the means to control the inputs from the local telephone set and the TCO and to interface these inputs with said CPU and to produce a tone signal,
 f) a tone transceiver circuit having the means to receive an identify the tone signal supplied by said line detector ring-tip interface circuit and to translate these tones to digital words for processing by said CPU and to produce precise tone burst signals as directed by said CPU, where the tone burst signals are applied to the TCO telephone line by way of a data access arrangement circuit having the means to translate the tone burst signals to a tone level that complies with government standards,
 g) a signal and control logic circuit having the means to control the communications between said CPU and said tone transceiver circuit,
 h) an impedance network that receives the telephone line input from the local telephone set and converts said input to a d-c level signal that does not exceed the input requirements of an operational amplifier that receives said signal,
 i) a switching means that applies the telephone line input from the TCO into said impedance network when said switch is placed in the Line Operate Mode and to disconnect the TCO input when said switch is placed in the Program Mode, where when said switch in either mode provides a mode control signal to said CPU where said CPU confirms said systems mode of operation,
 j) an input network having the means to receive the output signal from said operational amplifier and to produce a tone signal that is applied to the input of said transceiver circuit, and
 k) a power distribution circuit having the means to convert an a-c power source, provided by a power adapter connected to utility power, to the various d-c power levels required to operate said electronic circuits.

2. A remotely commanded telephone switch enhancing system that functions in combination with a local telephone set connected to a single telephone line having call forwarding service as provided by a Telephone Central Office (TCO) where said system comprises a set of electronic circuits having the means to allow said system to be commanded from a remotely located telephone set to initiate call forwarding, change a current call forwarded number to another number or to cancel call forwarding, wherein said set of electronic circuits comprises:

a) an internal bus that provides an interconnection means between selected circuits of said electronics circuits,
 b) a firmware program,
 c) a central processing unit (CPU) having the means to function in combination with said internal bus, a latch, a random access memory (RAM), a programmable read only memory (PROM) and said firmware to control the operation of said system where said RAM, controls a memory-mapped system and said PROM controls the systems operational codes,
 d) a power-on reset/RAM keep alive circuit having the means to initialize said CPU when said power distribution circuit is energized and where said power-on reset/RAM keep alive circuit maintains an internal battery that automatically switches on in the event of a utility power failure,
 e) a line detector ring-tip interface circuit having the means to control the inputs from the local telephone set and the TCO and to interface these inputs with said CPU and to produce a tone signal,
 f) a tone transceiver circuit having the means to receive an identify the tone signal supplied by said line detector ring-tip interface circuit and to translate these tones to digital words for processing by said CPU and to produce precise tone burst signals as directed by said CPU, where the tone burst signals are applied to the TCO telephone line by way of a data access arrangement circuit having the means to translate the tone burst signals to a tone level that complies with government standards, g) a signal and control logic circuit having the means to control the communications between said CPU and said tone transceiver circuit, h) circuit means to supply three signals as directed and controlled by said CPU: a read/write signal, a chip select signal and a clock signal where the signals are applied to and allow said tone transceiver circuit to be placed in any of its three modes of operation: call progress mode, tone burst mode or DTMF mode, and i) a power distribution circuit having the means to convert an a-c power source, provided by a power adapter connected to utility power, to the various d-c power levels required to operate said electronic circuits.

3. A power-on reset/RAM keep alive circuit that comprises a part of a remotely commanded telephone switch enhancing system that functions in combination with a local telephone set connected to a single telephone line having call forwarding service as provided by a Telephone Central Office (TCO) with said system having the means to be commanded from a remotely located telephone set to initiate call forwarding, change a current call forwarded number to another number or to cancel call forwarding where said circuit comprises:

a) means to initialize and interface with a CPU that controls the operation of said system, b) means to maintain a battery that automatically switches on in the event of a utility power failure where said battery retains the memory of a RAM that operates with said CPU, and c) a watch-dog timer circuit having the means to reset the operational characteristics of said CPU in the event a transient, in the power or the telephone line, disrupts the operational sequence of said CPU.

4. A line detector ring-tip interface circuit that comprises a part of a remotely commanded telephone switch enhancing system that functions in combination with a local telephone set connected to a single telephone line having call forwarding service as provided by a Telephone Central Office (TCO) with said system having the means to be commanded from a remotely located telephone set to initiate call forwarding, change a current call forwarded number to another number or to cancel call forwarding where said circuit comprises:

a) means to receive and control the inputs from the local telephone set and the TCO and to interface these inputs with a CPU and a tone transceiver circuit, b) an impedance network that receives the telephone line input from the local telephone set and converts said input to a d-c level signal that does not exceed the input requirements of an operational amplifier that receives said signal, c) a switching means that applies the telephone line input from the TCO into said impedance network when said switch is placed in the Line Operate Mode and to disconnect the TCO input when said switch is placed in the Program Mode, where when said switch in either mode provides a mode control signal to said CPU where said CPU confirms said systems mode of operation, and d) an input network having the means to receive the output signal from said operational amplifier and to produce a tone signal that is applied to the input of said transceiver circuit.

5. A signal and control logic circuit that comprises a part of a remotely commanded telephone switch enhancing system that functions in combination with a local telephone set connected to a single telephone line having call forwarding service as provided by a Telephone Central Office (TCO) with said system having the means to be commanded from a remotely located telephone set to initiate call forwarding, change a current call forwarded number to another number or to cancel call forwarding where said circuit comprises:

a) means to receive control signals from a CPU that controls the operation of said system, and b) means to control and produce a read/write signal, a chip select signal and a clock signal that are applied to and allow a tone transceiver circuit to be placed in either a call progress mode, tone burst mode, a DTMF mode where said modes are used in the operation of said system.

6. A remotely commanded telephone switch enhancing system that functions in combination with a local telephone set connected to a single telephone line having call forwarding service as provided by a Telephone Central Office (TCO) where said system comprises a set of electronic circuits having the means to allow said system to be commanded from a remotely located telephone set to initiate call forwarding, change a current call forwarded number to another number or to cancel call forwarding, wherein said set of electronic circuits comprises:

a) an internal bus that provides an interconnection means between selected circuits of said electronics circuits, b) a firmware program that comprises a two-level security access code that allows only authorized users to initiate, change or cancel the call forwarding service, c) a central processing unit (CPU) having the means to function in combination with said internal bus, a latch, a random access memory (RAM), a programmable read only memory (PROM) and said firmware to control the operation of said system where said RAM, controls a memory-mapped system and said PROM controls the systems operational codes, d) a power distribution circuit having the means to convert an a-c power source, provided by a power adapter connected to utility power, to the various d-c power levels required to operate said electronic circuits, e) a power-on reset/RAM keep alive circuit having the means to initialize said CPU when said power distribution circuit is energized and where said power-on reset/RAM keep alive circuit maintains an internal battery that automatically switches on in the event of a utility power failure, f) a line detector ring-tip interface circuit having the means to control the inputs from the local telephone set and the TCO and to interface these inputs with said CPU and to produce a tone signal, g) a tone transceiver circuit having the means to receive an identify the tone signal supplied by said lien detector ring-tip interface circuit and to translate these tones to digital words for processing by said CPU and to produce precise tone burst signals as directed by said CPU, where the tone burst signals are applied to the TCO telephone line by way of a data access arrangement circuit having the means to translate the tone burst signals to a tone level that complies with government standards, and h) a signal and control logic circuit having the means to control the communications between said CPU and said tone transceiver circuit.

7. A remotely commanded telephone switch enhancing system that functions in combination with a local telephone set connected to a single telephone line having call forwarding service as provided by a Telephone Central Office (TCO) where said system comprises a set of electronic circuits having the means to allow said system to be commanded from a remotely located telephone set to initiate call forwarding, change a current call forwarded number to another number or to cancel call forwarding wherein said set of electronic circuits comprises:
  a) an internal bus that provides an interconnection means between selected circuits of said electronics circuits,
  b) a firmware program,
  c) a central processing unit (CPU) having the means to function in combination with said internal bus, a latch, a random access memory (RAM), a programmable read only memory (PROM) and said firmware to control the operation of said system where said RAM is used to control a memory-mapped system and said PROM is used to control the systems operational codes,
  d) a power distribution circuit having the means to convert an a-c power source, provided by a power adapter connected to utility power, to the various d-c power levels required to operate said electronic circuits,
  e) a power-on reset/RAM keep-alive circuit having the means to initialize said CPU when said power distribution circuit is energized and where said power-on reset/RAM keep-alive circuit maintains an internal battery that automatically switches on in the event of a utility power failure,
  f) a line detector ring-tip interface circuit having the means to control the inputs from the local telephone set and the TCO and to interface these inputs with said CPU and to produce a tone signal,
  g) a tone transceiver circuit having the means to receive an identify the DTMF tone signals supplied by said line detector ring-tip interface circuit and to translate these tones to digital words for processing by said CPU and to produce precise tone burst signals as directed by said CPU, where the tone burst signals are applied to the TCO telephone line by way of a data access arrangement circuit having the means to translate the tone burst signals to a tone level,
  h) a signal and control logic circuit having the means to control the communications between said CPU and said tone transceiver circuit, and,
  i) a bus interface device system (BIDS) that allows a plurality of control lines from said system to be applied external to said system to allow said system to remotely control the operation of a plurality of implements located external to said system.

8. A remotely commanded telephone switch enhancing system that functions in combination with a local telephone set connected to a single telephone line having call forwarding service as provided by a Telephone Central Office (TCO) where said system comprises a set of electronic circuits having the means to allow said system to change call forwarding when said system is in a default mode and a local telephone set no. 1 is call forwarded to a remote telephone no. 3 and a user at said telephone set no. 3 wants to change the call forwarded telephone number from said telephone no. 3 to a remote telephone set no. 2 or 4 where the change is accomplished by the user and said system performing the following steps:
  a) the user at said remote telephone no. 3 calls the telephone number of said telephone no. 1 and after hearing a busy or a clicking noise hangs up,
  b) said system detects ring and waits for 60–90 seconds and then calls its own number or said telephone set no. 3 detects ring and gets an answer at said remote telephone no. 3,
  c) said system waits for a minimum of two seconds and then sends two beeps,
  d) the user inputs a valid access code 2,
  e) said system provides two beeps,
  f) the user inputs a 72#, the telephone number of said remote telephone set no. 2 or 4 and a command complete code,
  g) said system stores the telephone number of said telephone no. 2 or 4 and provides two beeps,
  h) the user hangs up,
  i) said system sends a 72# to the TCO together with the telephone number of remote telephone set no. 2 or 4, and
  k) said system waits for next call.

9. A remotely commanded telephone switch enhancing system that functions in combination with a local telephone set connected to a single telephone line having call forwarding service as provided by a Telephone Central (TCO) where said system comprises a set of electronic circuits having the means to allow said system to cancel call forwarding when said system is in a default mode and a local telephone set no. 1 is call forwarded to a remote telephone no. 3 and a user at said telephone set no. 3 wants to cancel call forwarding from said telephone set no. 3 where the cancellation is accomplished by the user and said system performing the following steps:
  a) the user at said remote telephone no. 3 calls the telephone number of said telephone no. 1 and after hearing a busy or a clicking noise hangs up,
  b) said system detects ring and waits for 60–90 second and then calls its own number or said telephone set no. 3 detects ring and gets an answer at said remote telephone no. 3,
  c) said system waits for a minimum of two seconds and then provides two beeps,
  d) the user inputs a valid access code 2,
  e) said system provides two beeps,
  f) the user inputs a 73# and a command complete code,
  g) said system provides two beeps,
  h) the user hangs up,
  i) said system sends a 73# to the TCO to cancel call forwarding, and
  j) said system waits for next call.

10. A remotely commanded telephone switch enhancing system that functions in combination with a local telephone set connected to a single telephone line having call forwarding service as provided by a Telephone Central Office (TCO) where said system comprises a set of electronic circuits having the means to allow said system to cancel call forwarding when said system is in a default mode and a local telephone set no. 1 is call forwarded to a remote telephone set no. 3 and a user at a remote telephone set 2 or 4 wants to cancel call forwarding where the cancellation is accomplished by the user and said system performing the following steps:
  a) the user at said telephone no. 2 or 4 calls the telephone number of said telephone no. 1 and after hearing one ring hangs up,
  b) said system detects ring and waits for 60-90 seconds, then calls its own number or said telephone set no. 3, detects the ring at said telephone no. 3 and gets an answer,
  c) said system waits for a minimum of two seconds and then sends two beeps and waits for ten seconds for an input from the user, if no valid access code 2 is received within the ten second period said system hangs up,
  d) said system sends a 73# to the TCO to cancel call forwarding and then waits for 120-150 seconds,
  e) the user, during the 120-150 second period, calls the telephone number of said telephone no. 1,
  f) said system detects ring and answers said telephone no. 1, waits for two seconds, and then provides two beeps,
  g) the user inputs a valid access code 2,
  h) said system gives two beeps,
  i) the user inputs a 73# and a command complete code,
  j) said system provides two beeps,
  k) the user hangs up,
  l) said system sends a 73# to TCO to cancel call forwarding, and
  m) said system waits for next call.

11. A remotely commanded telephone switch enhancing system that functions in combination with a local telephone set connected to a single telephone line having call forwarding service as provided by a Telephone Central Office (TCO) where said system comprises a set of electronic circuits having the means to allow said system to cancel call forwarding when said system is in a default mode and a local telephone set no. 1 is call forwarded to a remote telephone set no. 3 and user at a remote telephone set no. 2 or 4 wants to cancel call forwarding where the cancellation is accomplished by the user and said system performing the following steps:
  a) the user at said telephone no. 2 or 4 calls the telephone number of said telephone no. 1 and after hearing one ring hangs up,
  b) said system detects ring and waits for 60-90 seconds, then calls its own number or said telephone set no. 3, detects five rings at said telephone no. 3 and gets no answer,
  c) said system hangs up,
  d) said system sends a 73# to the TCO to cancel call forwarding and then waits for 120-150 seconds,
  e) the user, during the 120-150 second period, calls the telephone number of telephone no. 1,
  f) said system detects ring and answers said telephone no. 1, waits for a minimum of two seconds, and then provides two beeps,
  g) the user inputs a valid access code 2,
  h) said system gives two beeps,
  i) the user inputs a 73# and a command complete code,
  j) said system provides two beeps,
  k) the user hangs up,
  l) said system sends a 73# to TCO to cancel call forwarding, and
  m) said system waits for next call.

12. A remotely commanded telephone switch enhancing system that functions in combination with a local telephone set connected to a single telephone line having call forwarding service as provided by a Telephone Central Office (TCO) where said system comprises a set of electronic circuits having the means to allow said system to cancel call forwarding when said system is in a default mode and a local telephone set no. 1 is call forwarded to a remote telephone no. 3 and a user at a remote telephone set no. 2 or 4 wants to cancel call forwarding where the cancellation is accomplished by the user and said system performing the following steps:
  a) the user at said telephone no. 2 or 4 calls the telephone number of said telephone no. 1 and after hearing one ring hangs up,
  b) said system detects a ring, waits for 60-90 seconds, then calls its own number or said telephone set no. 3 and said system detects a busy signal at said telephone no. 3,
  c) said system hangs up,
  d) said system sends a 73# to the TCO to cancel call forwarding and then waits for 120-150 seconds,
  e) the user, during the 120-150 second period, calls the telephone number of telephone no. 1,
  f) said system detects ring and answers said telephone no. 1, waits for a minimum of two seconds, and then provides two beeps,
  g) the user inputs a valid access code 2,
  h) said system gives two beeps,
  i) the user inputs a 73# and a command complete code,
  j) said system provides two beeps,
  k) the user hangs up,
  l) said system sends a 73# to TCO to cancel call forwarding, and
  m) said system waits for next call.

13. A remotely commanded telephone switch enhancing system that functions in combination with a local telephone set connected to a single telephone line having call forwarding service as provided by a Telephone Central Office (TCO) where said system comprises a set of electronic circuits having the means to allow said system to change call forwarding when said system is in a default mode and a local telephone set no. 1 is call forwarded to a remote telephone set no. 3 and a user at a remote telephone set no. 2 or 4 wants to change the call forwarded telephone number from said telephone set no. 3 to said telephone set no. 2 or 4 where the change is accomplished by the user and said system performing the following steps:
  a) the user at said telephone no. 2 or 4 calls the telephone number of said telephone no. 1 and after hearing one ring hangs up,
  b) said system detects ring and waits for 60-90 seconds, then calls its own number or said telephone set no. 3, detects the ring at said telephone no. 3 and gets an answer,
  c) said system waits for a minimum of two seconds and then sends two beeps and waits for ten seconds for an input from the user, if no valid access code 2 is received within the ten second period said system hangs up,
  d) said system sends a 73# to the TCO to cancel call forwarding and then waits for 120-150 seconds,
  e) the user, during the 120-150 second period, calls the telephone number of telephone no. 1, f) said system detects ring and answers said telephone no. 1, waits for two seconds, and then provides two beeps,
g) the user inputs a valid access code 2,
h) said system gives two beeps,
i) the user inputs a 72#, the telephone number of said remote telephone set no. 2 or 4 and command complete code,
j) said system stores the telephone number of said telephone set no. 2 or 4 and provides two beeps,
k) the user hangs up,
l) said system sends a 72# to TCO together with the telephone number of remote telephone set no. 2 or 4, and
m) said system waits for next call.

14. A remotely commanded telephone switch enhancing system that functions in combination with a local telephone set connected to a single telephone line having call forwarding service as provided by a Telephone Central Office (TCO) where said system comprises a set of electronic circuits having the means to allow said system to be commanded from a remotely located telephone set to initiate call forwarding, change a current call forwarded number to another number or to cancel call forwarding, wherein said set of electronic circuits comprises:
a) an internal bus that provides an interconnection means between selected circuits of said electronics circuits,
b) a firmware program,
c) a central processing unit (CPU) having the means to function in combination with said internal bus, a latch, a random access memory (RAM), a programmable read only memory (PROM) and said firmware to control the operation of said system where said RAM is used to control a memory-mapped system and said PROM is used to control the systems operational codes,
d) a power distribution circuit having the means to convert an a-c power source, provided by a power adapter connected to utility power, to the various d-c power levels required to operate said electronic circuits,
e) a power-on reset/RAM keep-alive circuit having the means to initialize said CPU when said power distribution circuit is energized and where said power-on reset/RAM keep-alive circuit maintains an internal battery that automatically switches on in the event of a utility power failure,
f) a line detector ring-tip interface circuit having the means to control the inputs from the local telephone set and the TCO and to interface these inputs with said CPU and to produce a tone signal,
g) a tone transceiver circuit having the means to receive and identify the DTMF signals supplied by said line detector ring-tip interface circuit and to translate these tones to digital words for processing by said CPU and to produce precise tone burst signals as directed by said CPU, where the tone burst signals are applied to the TCO telephone line by way of a data access arrangement circuit having the means to translate the tone burst signals to a tone level, and
h) a signal and control logic circuit having the means to control the communications between said CPU and said tone transceiver circuit.

* * * * *